(12) United States Patent
Mattsson et al.

(10) Patent No.: US 9,148,476 B2
(45) Date of Patent: *Sep. 29, 2015

(54) VERIFIABLE TOKENIZATION

(71) Applicant: Protegrity Corporation, George Town, Grand Cayman (KY)

(72) Inventors: Ulf Mattsson, Cos Cob, CT (US); Vichai Levy, Norwalk, CT (US); Jan Boberg, Skelleftea (SE); Hans Meijer, Skelleftea (SE)

(73) Assignee: Protegrity Corporation, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,105

(22) Filed: Dec. 9, 2014

(65) Prior Publication Data
US 2015/0096046 A1    Apr. 2, 2015

Related U.S. Application Data

(63) Continuation of application No. 13/752,200, filed on Jan. 28, 2013, now Pat. No. 8,935,802.

(60) Provisional application No. 61/593,238, filed on Jan. 31, 2012, provisional application No. 61/593,241, filed on Jan. 31, 2012.

(51) Int. Cl.
*G06F 21/10* (2013.01)
*H04L 29/08* (2006.01)
(Continued)

(52) U.S. Cl.
CPC ............ *H04L 67/10* (2013.01); *G06F 21/6245* (2013.01); *G06F 21/6254* (2013.01); *G06Q 50/265* (2013.01)

(58) Field of Classification Search
CPC ....................................................... G06F 21/10
See application file for complete search history.

(56) References Cited

U.S. PATENT DOCUMENTS 2,950,048 A    8/1960  Luhn
7,120,933 B2  10/2006  Mattsson
(Continued)

OTHER PUBLICATIONS

Mattsson, U.T., "Format-Controlling Encryption Using Datatype-Preserving Encryption," National Institute of Standards and Technology, Dec. 5, 2012, pp. 1-46, can be retrieved at <http://csrc.nist.gov/groups/ST/toolkit/BCM/documents/proposedmodes/fc-em/fcem-spec.pdf>.

(Continued)

*Primary Examiner* — Teshome Hailu
*Assistant Examiner* — Thanh Le
(74) *Attorney, Agent, or Firm* — Fenwick & West LLP

(57) ABSTRACT

Use rules are included within tokenized data either before or after tokenization. The use rules can be appended to the data before or after tokenization, can be used to modify the data before or after tokenization, and can be used to select or generate token tables for use in tokenizing the data. The use rules limit how, where, and when the tokenized data can be used, who can use the tokenized data, and the like. In addition, data can be tokenized such that the tokenized data can be identified as tokenized based on the tokenized data failing a validation test. The data is tokenized using one or more token tables, and the validation test is applied to the tokenized data. If the tokenized data passes the validation test, the data is modified with formatting rules or re-tokenized with additional token tables until the tokenized data fails the validation test.

20 Claims, 3 Drawing Sheets

(51) Int. Cl.
*G06F 21/62* (2013.01)
*G06Q 50/26* (2012.01)

(56) References Cited

U.S. PATENT DOCUMENTS

| | | | |
|---|---|---|---|
| 7,274,792 B2* | 9/2007 | Chin et al. | 380/262 |
| 7,305,707 B2 | 12/2007 | Mattsson | |
| 8,458,487 B1* | 6/2013 | Palgon et al. | 713/185 |
| 2008/0005786 A1 | 1/2008 | Dreymann | |
| 2008/0082834 A1 | 4/2008 | Mattsson | |
| 2009/0249082 A1* | 10/2009 | Mattsson | 713/193 |
| 2010/0077051 A1 | 3/2010 | Daniell et al. | |
| 2011/0099104 A1 | 4/2011 | Nybom | |
| 2011/0213807 A1 | 9/2011 | Mattsson | |
| 2011/0307714 A1* | 12/2011 | Comrie et al. | 713/189 |
| 2013/0047200 A1* | 2/2013 | Radhakrishnan et al. | 726/1 |
| 2013/0103685 A1 | 4/2013 | Preneel et al. | |

OTHER PUBLICATIONS

McCallister, E., et al., Guide to Protecting the Confidentiality of Personally.

Identifiable Information (PII), National Institute of Standards and Technology, U.S. Department of Commerce, Jan. 2009, pp. 2-58, can be retrieved at <http://csrc.nist.gov/puplications/PubsSPs.html>.

United States Office Action, U.S. Appl. No. 13/752,200, May 23, 2014, 11 pages.

* cited by examiner

VERIFIABLE TOKENIZATION

CROSS REFERENCE TO RELATED APPLICATIONS

This application is a continuation of U.S. application Ser. No. 13/752,200, filed Jan. 28, 2013, now U.S. Pat. No. 8,935,802, which claims the benefit of Provisional Application No. 61/593,238, filed on Jan. 31, 2012, and Provisional Application No. 61/593,241, filed on Jan. 31, 2012, the contents of which are incorporated herein by reference.

FIELD OF ART

This application relates generally to the field of data protection, and more specifically to data tokenization.

BACKGROUND

Many challenges exist in handling sensitive data, such as credit card numbers, social security numbers, bank account numbers, driving license numbers, and the like. In use, a system for processing such sensitive data transmits the sensitive data between multiple authorized entities, any of which can store the sensitive data. For example, in a retail environment, a user may swipe a credit card at a register, the register may transmit the credit card number to a local server, the local server may transmit the credit card number to a bank, and so forth. In this example, the credit card number may be stored at the register, the local server, the bank, and at any other intermittent entity implemented within such a retail environment. In such a system, the sensitive data is vulnerable to interception by unauthorized entities at multiple points, such as during each transmission between authorized entities or while stored at any authorized entity.

To prevent unauthorized access to sensitive data, steps can be taken to protect the sensitive data. Such data protection measures are required by many jurisdictions for various categories of sensitive data. The sensitive data can be encrypted during transmission or storage using an encryption algorithm and encryption key, but encryption can be broken by various hacking methods. Data storage security measures can be implemented while the sensitive data is stored at an authorized entity, but such storage security measures generally protect against intrusion by an unauthorized entity and don't protect the sensitive data after the unauthorized entity has overridden or bypassed the storage security measures.

SUMMARY

Sensitive data is tokenized using one or more token tables by a tokenization system (such as a mobile device, payment terminal, or other computing device) by subsequent storage or transmission. Data can be tokenized, for example, in response to receiving a tokenization request.

Tokenized data may include one or more use rules that each define one or more limitations that restrict the usage of the tokenized data. Such tokenized data is referred to as "self aware tokenized data" herein. The use rules may be included in the tokenized data by appending the use rule to the sensitive data either before or subsequent to the tokenization of the data. Use rules may, for example, take the form of identity rules (e.g., limit who can send an email message to an email address represented by the tokenized data), or transaction rules (e.g., how much money can be spent using a credit card number represented by the tokenized data). The use rules may also be used to generate or select one or more token tables for use in tokenizing the sensitive data.

To distinguish between tokenized data and un-tokenized data, the tokenization system may be configured to generate tokenized data that intentionally fails a validation test. Such tokenized data is referred to as "verifiable tokenized data" herein. To generate a token that fails the validation test, sensitive data is tokenized using one or more token tables. The verification test is applied to the tokenized data and, if the tokenized data passes the validation test, the tokenized data is modified according to a set of formatting rules (e.g. modulus addition of a predetermined number to the tokenized data) such that the tokenized data does not pass the validation test.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
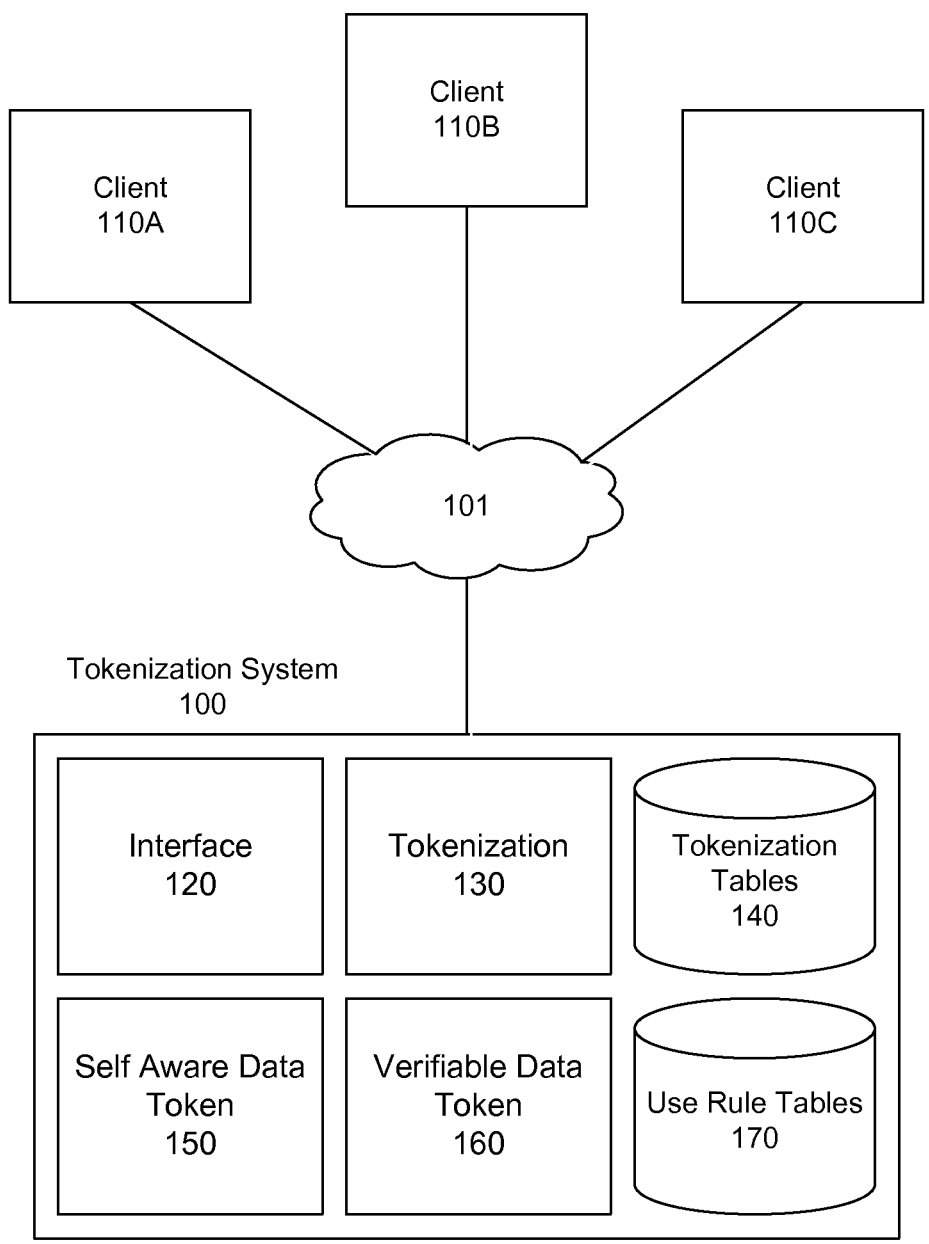
FIG. 1 illustrates a tokenization environment, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Tokenization Overview

The transmission and storage of sensitive data, such as credit card numbers, social security numbers, bank account numbers, driving license numbers, etc, is oftentimes challenging. Before sensitive data can be transmitted or stored, the sensitive data is usually encrypted or tokenized into tokenized data to prevent an unauthorized entity from accessing the data.

As used herein, the tokenization of data refers to the generation of tokenized data by querying one or more token tables mapping input values to tokens with the one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or DTP), a one-way non-reversible cryptographic function (e.g., a hash function with strong, secret salt), or a similar encryption before or after the tokenization of the sensitive data. Any suitable type of encryption can be used in the tokenization of data.

As used herein, the term token refers to a string of characters mapped to an input string of characters in a token table, used as a substitute for the string of characters in the creation of tokenized data. A token may have the same number of characters as the string being replaced, or can have a different number of characters. Further, the token may have characters of the same type (such as numeric, symbolic, or alphanumeric characters) as the string of characters being replaced or characters of a different type.

Any type of tokenization may be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and may include every possible input string value. The second column of an SLT includes tokens, with each associated with an input string value of the first column. Each token in the second column may be unique among the tokens in the second column. Optionally, the SLT may also include one or several additional columns with additional tokens mapped to the input string values of the first column.

In some embodiments, to increase the security of tokenization, sensitive data can be tokenized two or more times using the same or additional token tables. For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data may also be left untokenized; thus a first subset of the resulting tokenized data may contain portions of the sensitive data and a second subset of the tokenized data may contain a tokenized version of the sensitive data.

Dynamic token lookup table ("DLT") tokenization operates similarly to SLT tokenization, but instead of using static tables for multiple tokenizations, a new token table entry is generated each time sensitive data is tokenized. A seed value can be used to generate each DLT. In some embodiments, the sensitive data or portions of the sensitive data can be used as a seed value to generate a DLT. DLTs can in some configurations provide a higher level of security compared to SLT but require the storage and/or transmission of a large amount of data associated with each of the generated token tables. While DLT tokenization can be used to tokenize data according to the principles described herein, the remainder of the description will be limited to instances of SLT tokenization for the purposes of simplicity.

Tokenization System Environment

FIG. 1 illustrates a tokenization environment, according to one embodiment. The tokenization environment of FIG. 1 includes a tokenization system 100 and a plurality of clients, client 110A, 110B, and 110C ("clients 110", collectively), communicatively coupled through a connecting network 101. While only three clients are shown, in practice the environment can include any number of clients, and can include additional components not illustrated herein.

The clients 110 are entities capable of transmitting sensitive data to or receiving data from the tokenization system 100 via the connecting network 101. A client can be a device, such as a computer, a cash register, a server, a payment terminal, a mobile phone or device; can be a service, such as an online payment system; or can be any other entity, such as a user of the tokenization system, a credit card provider, a bank, a merchant, and the like. The clients interact with the tokenization system using software such as a web browser or other application with communication functionality. Such software can include an interface for communicating with the tokenization system via the connecting network. For example, client 110A can be a merchant terminal capable of receiving credit card information from a merchant customer, and client 110B can be a bank. In this example, a customer can swipe a credit card at the merchant terminal, the merchant terminal can receive the credit card's number, the tokenization system can tokenize the credit card number, and the tokenized credit card number can be sent to the bank.

In some embodiments, the client device may be a mobile computing device running a mobile wallet application. As used herein, a mobile wallet application is software that organizes payment or account information (such as credit card information or bank account information) to allow the mobile device to conduct transactions. The mobile device may include a wireless communication transceiver (such as a near field communication or NFC transceiver) to wirelessly communicate with a payment terminal (such as a cash register). The mobile device running the mobile wallet application can receive information regarding a transaction (such as an amount of the transaction, a transaction type, and the like) and can send payment information to complete the transaction. A mobile wallet application that contains information about a credit card can perform a transaction by, for example, waving the mobile device containing the mobile wallet application over a payment terminal receiver.

The connecting network 101 is typically the Internet, but may be any network, including but not limited to a LAN, a MAN, a WAN, a mobile wired or wireless network, a private network, a virtual private network, a direct communication line, and the like. The connecting network can be a combination of multiple different networks. In such embodiments, the tokenization system can be implemented at, within, or co-located with a client. For example, the tokenization system 100 can be an application installed on the client 110A, and the connecting network can include internal circuitry coupling the tokenization system to other portions of the client 110A, and can include the internet coupling the tokenization system to the client 110B.

The tokenization system 100 includes an interface module 120, a tokenization module 130, a token tables storage module 140, a self aware tokenization module 150, a use rule tables storage 170, and a verifiable tokenization module 160. Other conventional features, such as firewalls, load balancers, authentication servers, application servers, failover servers, site management tools, and so forth, can be included in other embodiments, but are not shown so as to more clearly illustrate the features of the tokenization system. It will be appreciated that the operations and processes of the tokenization system 100 are sufficiently complex and time consuming as to necessarily require their implementation in a digital computer system, and cannot be performed for practical, commercial purposes in the human mind by mental steps.

The interface module 120 provides the interface between the tokenization system 100 and the clients 110. The interface module 120 receives input data and a tokenization request from a first client, and returns tokenized data responsive to the request to the first client or to a second client. The interface module 120 can receive a seed value from a client for use in tokenizing input data (for instance, for use as an initialization vector, an encryption key, a token table identifier, and the like). The interface module 120 can receive any additional information associated with the tokenization of data or tokenization requests, such as login/password/verification information from clients, the identity of users of the tokenization system, time information associated with the tokenization request, encryption keys, and the like. The interface module 120 can prompt a client for information in response to a received request for tokenized data, and can include a graphic user interface (GUI) or any other communicative interface capable of display at or interaction with a client.

Tokenization requests are received at the tokenization system 100 from a client device 110. Tokenization can be explicitly requested (for instance, a merchant may request that a record be tokenized prior to storing the record), or can be implicitly requested (for instance, by a ticket dispenser in response to the swiping of a credit card by a user). Tokenization requests include data to be tokenized (herein "input data X" for purposes of description) and can include a seed value K and any other information required for authentication or tokenization. The tokenization request may also include identification of a tokenization scheme. A tokenization scheme can specify a pre-tokenization data modification for use in tokenization, the method used to tokenize data, a number of tokenization iterations, and the like.

The tokenization module 130 tokenizes the input data X using a token table T. A detailed explanation of the tokenization process can be found in U.S. patent application Ser. No. 13/595,438, filed Aug. 27, 2012, which is hereby incorporated by reference. The tokenization module 130 tokenizes data using the tokenization method indentified in a tokenization scheme included in a tokenization request, or by using a default tokenization method, if no tokenization scheme is identified in the request.

In some embodiments, one or more initialization vectors V are used by the tokenization module 130 to modify the input data X prior to tokenization. The modification of X based on the initialization vectors V can include the addition of an initialization vector V to X prior to tokenization. For example, one or more initialization vectors V can be added to the input data X, for instance using digit-wise modulo 10 addition. Alternatively, the modification of X based on the initialization vectors V can include the subtraction of one or more initialization vectors V from X, the multiplication of one or more initialization vectors V and X, or any other modifying operation between the initialization vectors V and X, arithmetic or otherwise. It should also be noted that portions of input data X can be modified based on portions of one or more initialization vectors V. In one embodiment, for tokenization including multiple tokenization iterations, the input data X and each post-iteration tokenized data are modified by a different initialization vector V prior to the tokenization of the next iteration. In other embodiments not described herein, the input data X is not modified based on initialization vectors V. In these embodiments, post-iteration tokenized data can be modified by initialization vectors V prior to subsequent tokenization.

The tokenization module 130 tokenizes the input data X and produces the tokenized data Y for transmission to a client 110 or for storage in a non-transitory computer-readable storage medium at the tokenization system 100 (not shown in FIG. 1). The tokenization module can perform any requested type of tokenization for any requested number of tokenization iterations. In embodiments where a tokenization request or a requested tokenization scheme do not specify a type of tokenization and a number of tokenization iterations, a default tokenization type and number of iterations can be performed. For the purposes of simplicity, the description of the selection of token tables from the token table set T used by the tokenization module for tokenization is limited to the random selection of token tables, though in other embodiments, token tables can be selected based on a tokenization request, a requested tokenization scheme, or a table selection default.

The algorithm for a tokenization iteration is as follows. The tokenization module 130, during a tokenization iteration, selects a table, $T_1$, from the token table set T, which includes a plurality of different token tables. In this embodiment, the tokenization module tokenizes the input data X by querying the selected table $T_1$ with the input data X to identify a token, $Y_1$, in $T_1$ associated with an input column value of X. If no additional tokenization iterations are to be performed (for instance, if no additional iterations are requested), the tokenization module outputs $Y_1$ as the tokenized data Y. Alternatively, if additional tokenization iterations are requested, $Y_1$ is used as an input for a next tokenization iteration. For example, a second table $T_2$ is selected from the token table set T, and $T_2$ is queried using $Y_1$ to produce $Y_2$. This process is continued for p iterations, after which $Y_p$ is outputted as the tokenized data Y, where p is a requested or default number of tokenization iterations to be performed.

The token tables used by the tokenization module 130 are stored in the token tables storage module 140. In some embodiments, each stored token table or set of token tables is associated with a unique identifier. Instead of including a seed value K, a tokenization request or requested tokenization scheme can include identifiers for one or more token tables or sets of token tables stored in the token tables storage module.

Self Aware Tokenization

An additional layer of security can be added to tokenized data by including information within the tokenized data limiting the use of the tokenized data. Such information is referred to as "use data" or "use rules," and as noted above, tokenized data including use data is referred to as "self aware tokenized data." Use data can limit the use of a tokenized data to any combination of user, group, application, system, time period, geographic region, enterprise division, transaction type, transaction quantity, transaction amount. For example, a use rule may limit the use of a tokenized email address to send emails to a particular recipient or recipient list, to a particular date or time, to emails sent to a fewer than a threshold number of individuals, to emails sent from a particular geographic region, and the like. Use data can also limit the use of tokenized financial data (e.g., a credit card or account number) to specific types of transactions, such as transactions below a threshold amount, transactions with particular merchants, transactions for particular products or services, transactions occurring within a particular date or time range, transactions within a particular geographic region, transactions from specific mobile wallet accounts or computing platforms, or any other transaction characteristics.

To construct self aware tokenized data, the self aware tokenization module 150 adds data representing one or more use rules to the tokenized data. Use rules can be chosen from the use rule storage 170, which stores a plurality of use rules. The use rule storage 170 may list all available use rules to a user for selection in tokenizing data, and may store use rules created by a user when tokenizing data. Use rules can also be created by a user of the tokenization system 100, which can be stored in the use rule storage 170 for subsequent use. In some embodiments the use rule can be represented by a rule identifier. For example, a 1-digit use rule maps a 1-digit identifier to a corresponding use rule. Use rules may also be identified by a Rule ID (e.g., ID "001" identifies rule No. 1), or a string (e.g., string "Token Rule 1" identifies rule NO. 1). In one embodiment, use rule storage 170 may contain a table that maps the identifier to the corresponding use rule.

In one embodiment, a use rule can be used as a tokenization seed value. For a use rule that limits the use of a recipient email address to a particular sender email address, the recipient email address can be tokenized using the sender email address as a tokenization seed value (for instance, identifying or generating one or more token tables for use in tokenization), preventing the use of the tokenized recipient email address by unauthorized entities. Such an example use rule can be used in circumstances where the recipient first sends an email to the sender, but disguises the recipient's email address by tokenizing the address using the sender address as a seed value. If the sender subsequently sends an email message to the tokenized recipient email address, an email server associated with the recipient email address tries to de-tokenize the recipient email address using the sender email address as a seed value (for instance, identifying or generating the one or more token tables used in tokenization). If the email server is unable to de-tokenize the token recipient email address, the email message is determined to originate from an unauthorized sender email address, and the email message is rejected. In one embodiment, such email messages are sent to a spam messages folder or to a junk messages folder, and the unauthorized sender may be identified as a known spammer by the email server.

In other embodiments, the recipient's email server includes a mapping of tokenized email addresses to the non-tokenized email addresses. When an email message with a tokenized recipient address is received, the email server can query the mapping to retrieve the non-tokenized recipient email address. In such embodiments, the email server can attempt to tokenize the retrieved non-tokenized recipient email address using the sender's email address, and if the resulting tokenized recipient email address does not match the received tokenized email address, the sender email address is determined to be unauthorized to send email messages to the recipient email address and the email message is rejected.

In some embodiments, use rules may be appended to sensitive data before or after tokenization. For example, a use rule indicating that a credit card or account number can only be used for transactions below a certain amount (e.g., $50) can be appended to the credit card number, and the resulting number is tokenized prior to transmission to a merchant. Alternatively, the credit card number can be tokenized, and the use rule can be appended to the tokenized credit card number prior to transmission. In one embodiment, the use rule itself is not tokenized. This way, the system receiving the tokenized data does not need to de-tokenize the tokenized data to access the use rule. Such embodiments beneficially allow merchants and other entities to reject transactions without detokenizing the credit card number if the transaction does not satisfy the use rule (e.g., the transaction is a purchase over $50, and the use rule restricts transactions to under $50). In another embodiment, both the sensitive data and the use rules are tokenized to prevent an un-authorized user from obtaining the tokenized data and replacing the portion containing the use rules with different use rules. In such embodiments, the portion of the tokenized data containing the use rules can be de-tokenized without the need of de-tokenizing the entire tokenized data.

In some embodiments, use rules can be included within tokenized data through various types of operations performed on the sensitive data before or after tokenization. For example, for a 1-digit use rule, a modulus addition can be performed on one of the digits of a tokenized credit card number with the 1-digit use rule. The use rule may then be retrieved from the tokenized data by determining the number that needs to be subtracted from the modified digit in order for the tokenized data to pass a validation check (such as a checksum). Upon receiving the tokenized data, a validation check can be performed, and if the tokenized data fails to validation check, a number can be identified that, when subtracted from a pre-determined digit of the tokenized data, allows the tokenized data to pass the validation check. In this example, the identified number is the use rule for the tokenized data.

When using a mobile wallet application associated with a credit card number running on a mobile computing device (e.g., a smartphone), one or more use rules can be added to the tokenized credit card number to limit the usage of the tokenized credit card number in case the token is intercepted by an unauthorized party during the wireless transmission of the tokenized credit card number (using, for example, a near field communication transceiver). The mobile wallet application can apply a use rule that limits the transaction to the geographical location the user is currently in (e.g., determined using the mobile device's GPS receiver). The mobile wallet application can further apply a use rule that limits the period of time in which the token can be used, and a use rule to limit the amount and/or the type of the transaction (e.g., as specified by the user of the mobile wallet, and/or as specified by the payment terminal).

Figure 2:
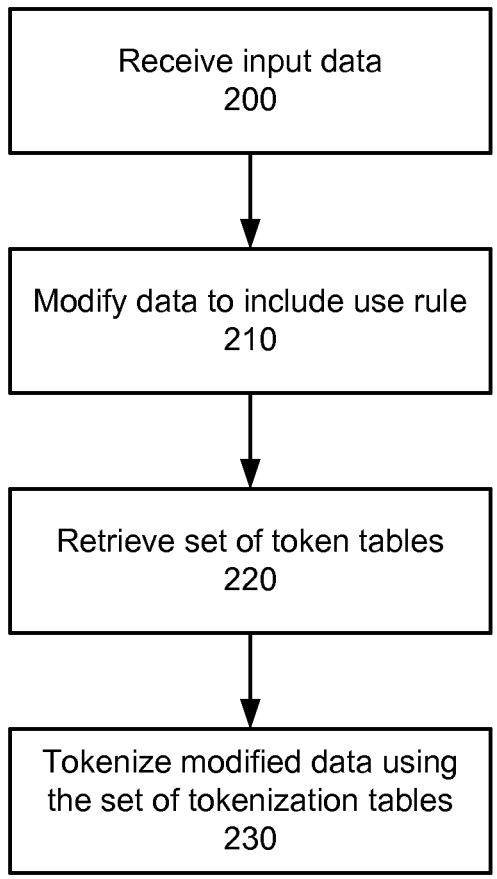
FIG. 2 is a flowchart of a tokenization process for generating self aware tokenized data, according to one environment.

FIG. 2 is a flowchart illustrating the process of generating self aware tokenized data, according to one embodiment. Input data is received 200. The input data can be received in conjunction with one or more use rules appended to the data as variously described above. The received use rules are used to modify 210 the input data. In some embodiments, the modification of the input data includes appending a set of characters representing the use rule to the input data. In other embodiments, the modification of the input data includes performing operations, such as modulo addition, on the input data with data representing the use rule.

A set of token tables is retrieved 220. In some embodiments, the use rule is used to determine which token tables are retrieved, while in other embodiments, the token tables are generated based on the use rule (for instance, using the use rule as a seed to generate a set of token tables). The modified data is tokenized 230 using the retrieved set of token tables. In alternative embodiments, the input data is tokenized prior to modifying the data to include the use rule (for instance, the use rule can be appended to the tokenized data, and can be subsequently tokenized itself). In some embodiments, the use rule is embedded within the token table used to tokenize the input data and thus, the input data does not need to be modified to include the use rule prior to tokenization.

Verifiable Tokenization

In various financial systems, transaction data can be formatted such that the validity of the transaction data can be determined prior to the use of the transaction data. For example, the last digit of a credit card number corresponds to a Luhn number, which is generated based on the other digits of the credit card number. A validation test can be performed on such transaction data in order to verify the validity of the transaction data. For example, a Luhn test can be performed on the first 15 digits of a credit card number and compared to the last digit of the credit card number—if the two numbers match, then the received credit card number passes the Luhn validation test and is determined to be valid. It should be noted that while the remainder of the description herein is limited to embodiments in which credit card numbers are tokenized and the Luhn validation test is used to verify the validity of the tokenized credit card numbers, any data can be tokenized (such as bank account numbers, social security numbers, driver's license numbers, and the like) and any suitable data validation test may be used according to the principles described herein.

In order to differentiate tokenized data from untokenized data, the verifiable tokenization module 160 can convert data into tokenized data that fails a validation test. For example, a credit card number can be iteratively re-tokenized until the resulting tokenized data fails the Luhn validation test. The credit card number is tokenized using a first token table. If the resulting tokenized data passes the Luhn validation test, the credit card number is tokenized a second time using a second token table. This process can be repeated for any number of tokenization iterations until tokenization using a token table results in tokenized data that fails the validation test.

In one embodiment, instead of selecting a different token table for each tokenization iteration, the verifiable tokenization module generates a new token table, such as a DLT. Alternatively, instead of selecting or generating a new token table if the tokenized data fails the validation test, the tokenized data can instead be modified using a formatting rule so that the modified tokenized data fails the validation test. Tokenized data that fails a validation test is referred to herein as "verifiable tokenized data", as it can be verified that the tokenized data does not represent data that otherwise can pass the validation test.

Formatting rules specify how tokenized data can be modified to fail a validation test. For example, a formatting rule may specify a modulus addition operation of a check sum to the fifth digit of a credit card number. In some embodiments, the verifiable tokenization module 160 includes a sequence of formatting rules that can be used to generate verifiable tokenized data. The verifiable tokenization module 160 may apply one or more of the formatting rules, for instance sequentially, until the generated tokenized data fails the validation test.

Upon determining that the tokenized data fails a validation test, the verifiable tokenization module 160 can transmit the verifiable tokenized data to a receiving system (such as a payment network or bank server) that has access to the token tables and formatting rules used by the verifiable tokenization module to tokenize the data. After the receiving system receives the verifiable tokenized data, the original data can be recovered using the token tables and formatting rules used to tokenize the original data. For example, if a formatting rule is used that modifies tokenized credit card data by adding the Luhn number of the credit card to the fifth digit of the tokenized credit card data to obtain verifiable tokenized credit card data, the receiving system can subtract the Luhn number from the fifth digit of the verifiable tokenized credit card data to obtain the tokenized credit card data. The receiving system can then detokenize the tokenized credit card data to obtain the original credit card data using the token tables used by the verifiable tokenization module to tokenize the credit card data.

Upon receiving verifiable tokenized data, the receiving system performs a validation check (e.g., Luhn check) to determine that the received data is tokenized. If the received data fails the validation check, the receiving system determines that the received data is tokenized, and the receiving system detokenizes the tokenized data. In some embodiments the receiving system subsequently performs the validation check on the detokenized data to determine its validity. If the detokenized data fails the validation check, the receiving system can determine that a formatting rule was applied to the tokenized data, and the receiving system can reverse the formatting operation performed by the formatting rule on the tokenized data. The resulting tokenized data is then detokenized, and the validity of the detokenized data is verified using the validation test. In one embodiment, the receiving system performs a number of reverse formatting operations on the tokenized data until the detokenized data passes the validation test.

Figure 3:
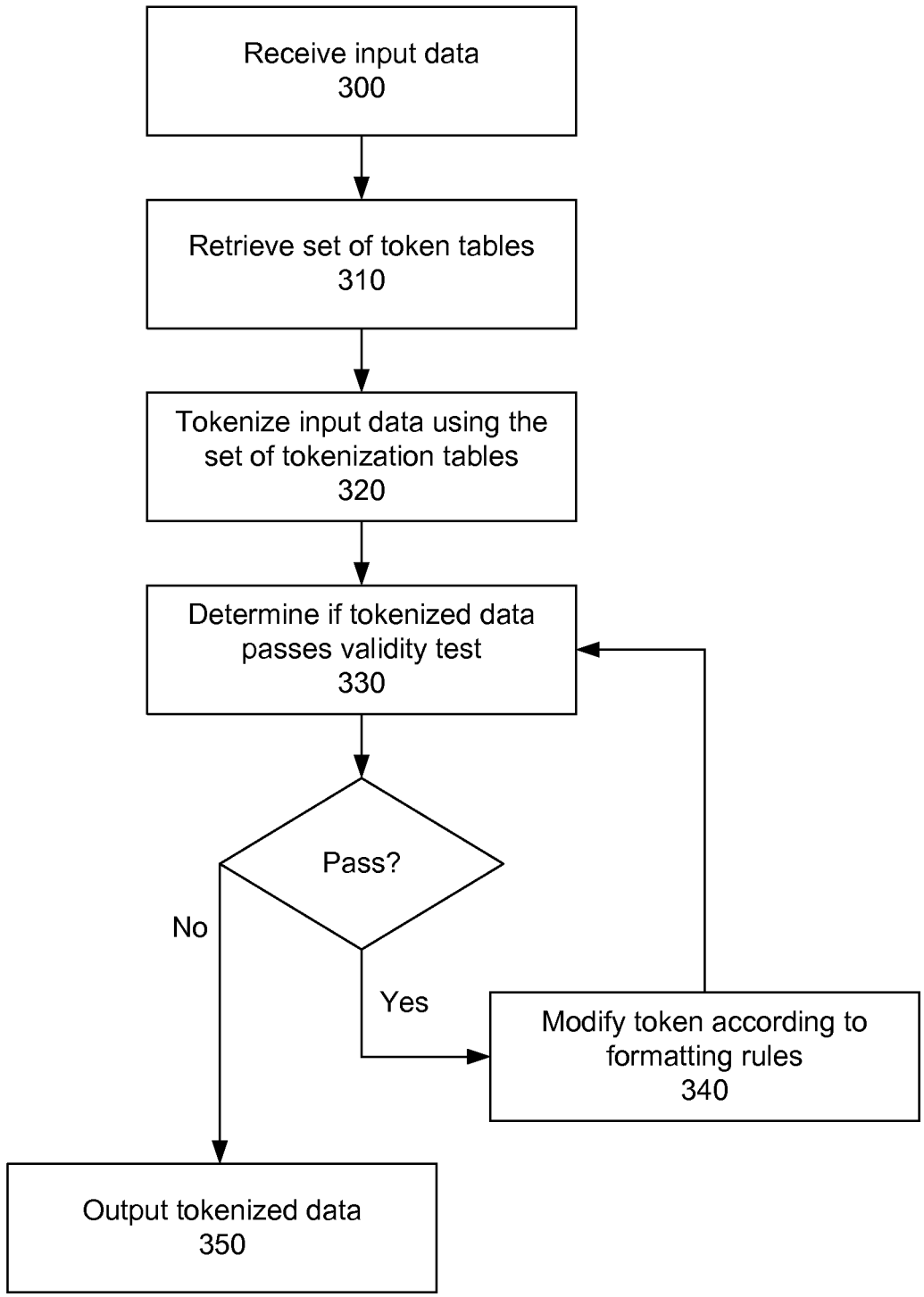
FIG. 3 is a flowchart of a tokenization process for generating verifiable tokenized data, according to one environment.

FIG. 3 is a flowchart illustrating the process of generating verifiable tokenized data, according to one embodiment. Input data, such as a credit card number, is received 300. The received input data is capable of passing a validation test, such as the Luhn test. A set of token tables is retrieved 310 and the input data is tokenized 320 using the retrieved set of token tables. The validity of the tokenized data is determined 330 based on a validation test. If the tokenized data passes the validation test, the token is modified 340 according to one or more formatting rules until the resulting tokenized data fails the validation test. Alternatively, the input data can be re-tokenized using one or more different token tables (for instance by generating a new token table, or retrieving a previously-generated different token table). This process can be repeated until the resulting tokenized data fails the validation test, after which the tokenized data is outputted 350, for instance to a receiving system with access to the token tables and formatting rules used to generate the tokenized data.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

It should be noted that various functionalities described herein may be combined in ways not explicitly described. For instance, data can be tokenized to include one or more use rules such that the resulting tokenized data fails a validation test and is verifiable. Thus, while self aware tokenization and verifiable tokenization are described separately, aspects of each may be performed in concert, and the resulting tokenized data can be both self aware tokenized data and verifiable tokenized data.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for tokenizing data comprising:
   receiving, by a computing device, data to be tokenized, the received data configured to pass a validation test that determines data validity based on a result of a mathematical operation performed on all or part of the received data;
   accessing a token table for use in tokenizing the received data, the token table mapping each of a plurality of input values to a different token value;
   querying the accessed token table with a portion of the received data to identify a token value mapped to the value of the portion of the received data;
   generating tokenized data by replacing the portion of the received data with the identified token value;
   determining if the tokenized data passes the validation test; and
   responsive to the tokenized data passing the validation test, modifying the tokenized data such that the modified tokenized data does not pass the validation test.

2. The method of claim 1, wherein the validation test comprises the performance of a checksum operation on data.

3. The method of claim 2, wherein modifying the tokenized data comprises performing modulus addition on the tokenized data using a checksum value.

4. The method of claim 3, wherein the modulus addition comprises the modulus addition of the checksum value to a predetermined digit or a set of predetermined digits of the tokenized data.

5. The method of claim 1, wherein a portion of the tokenized data comprises a same value as a corresponding portion of the received data, and wherein the corresponding portion of the received data is used as an initialization vector in generating the tokenized data.

6. The method of claim 1, wherein the received data comprises a credit card number, and wherein the validation test comprises a Luhn validation test.

7. The method of claim 1, wherein modifying the tokenized data comprises:
   accessing a second token table; and
   generating second tokenized data by replacing the portion of the received data with a second token value mapped to the value of the portion of the received data, the modified tokenized data comprising the modified tokenized data.

8. A system for tokenizing data comprising:
   a non-transitory computer-readable storage medium comprising executable computer instructions configured to:
      receive data to be tokenized, the received data configured to pass a validation test that determines data validity based on a result of a mathematical operation performed on all or part of the received data;
      access a token table for use in tokenizing the received data, the token table mapping each of a plurality of input values to a different token value;
      query the accessed token table with a portion of the received data to identify a token value mapped to the value of the portion of the received data;
      generate tokenized data by replacing the portion of the received data with the identified token value;
      determine if the tokenized data passes the validation test; and
      responsive to the tokenized data passing the validation test, modify the tokenized data such that the modified tokenized data does not pass the validation test; and
   a processor configured to execute computer instructions.

9. The system of claim 8, wherein the validation test comprises the performance of a checksum operation on data.

10. The system of claim 9, wherein modifying the tokenized data comprises performing modulus addition on the tokenized data using a checksum value.

11. The system of claim 10, wherein the modulus addition comprises the modulus addition of the checksum value to a predetermined digit or a set of predetermined digits of the tokenized data.

12. The system of claim 8, wherein a portion of the tokenized data comprises a same value as a corresponding portion of the received data, and wherein the corresponding portion of the received data is used as an initialization vector in generating the tokenized data.

13. The system of claim 8, wherein the received data comprises a credit card number, and wherein the validation test comprises a Luhn validation test.

14. The system of claim 8, wherein modifying the tokenized data comprises:
 accessing a second token table; and
 generating second tokenized data by replacing the portion of the received data with a second token value mapped to the value of the portion of the received data, the modified tokenized data comprising the modified tokenized data.

15. A non-transitory computer-readable storage medium storing executable computer instructions for tokenizing data, the instructions, when executed, configured to perform steps comprising:
 receiving data to be tokenized, the received data configured to pass a validation test that determines data validity based on a result of a mathematical operation performed on all or part of the received data;
 accessing a token table for use in tokenizing the received data, the token table mapping each of a plurality of input values to a different token value;
 querying the accessed token table with a portion of the received data to identify a token value mapped to the value of the portion of the received data;
 generating tokenized data by replacing the portion of the received data with the identified token value;
 determining if the tokenized data passes the validation test; and
 responsive to the tokenized data passing the validation test, modifying the tokenized data such that the modified tokenized data does not pass the validation test.

16. The computer-readable storage medium of claim 15, wherein the validation test comprises the performance of a checksum operation on data.

17. The computer-readable storage medium of claim 16, wherein modifying the tokenized data comprises performing modulus addition on the tokenized data using a checksum value.

18. The computer-readable storage medium of claim 17, wherein the modulus addition comprises the modulus addition of the checksum value to a predetermined digit or a set of predetermined digits of the tokenized data.

19. The computer-readable storage medium of claim 15, wherein a portion of the tokenized data comprises a same value as a corresponding portion of the received data, and wherein the corresponding portion of the received data is used as an initialization vector in generating the tokenized data.

20. The computer-readable storage medium of claim 15, wherein modifying the tokenized data comprises:
 accessing a second token table; and
 generating second tokenized data by replacing the portion of the received data with a second token value mapped to the value of the portion of the received data, the modified tokenized data comprising the modified tokenized data.

* * * * *